(12) United States Patent
Graber

(10) Patent No.: US 7,152,849 B2
(45) Date of Patent: Dec. 26, 2006

(54) FASTENER

(75) Inventor: Loren R. Graber, Nappanee, IN (US)

(73) Assignee: Digger Specialties, Inc., Bremen, IN (US)

( * ) Notice: Subject to any disclaimer, the term of this patent is extended or adjusted under 35 U.S.C. 154(b) by 15 days.

(21) Appl. No.: 10/986,589

(22) Filed: Nov. 12, 2004

(65) Prior Publication Data

US 2005/0127344 A1    Jun. 16, 2005

Related U.S. Application Data

(60) Provisional application No. 60/519,409, filed on Nov. 12, 2003.

(51) Int. Cl.
*E04H 17/16* (2006.01)

(52) U.S. Cl. .................... 256/22; 256/70; 403/DIG. 11

(58) Field of Classification Search ........ 403/DIG. 11, 403/387, 329; 256/21, 22, 70, 65.09
See application file for complete search history.

(56) References Cited

U.S. PATENT DOCUMENTS

| | | | | |
|---|---|---|---|---|
| 2,614,827 A | * | 10/1952 | Peach et al. | ................. 285/192 |
| 2,946,612 A | | 7/1960 | Ahlgren | |
| 3,756,567 A | * | 9/1973 | Murdock | ...................... 256/21 |
| 3,949,836 A | * | 4/1976 | Russo | ........................ 182/194 |
| 3,955,801 A | * | 5/1976 | Soriero, Jr. | .............. 256/65.13 |
| 4,506,419 A | | 3/1985 | Mitomi | |
| 5,150,885 A | * | 9/1992 | Leone | .......................... 256/22 |
| 5,649,783 A | | 7/1997 | Ichikawa et al. | |
| 6,155,741 A | * | 12/2000 | Took | .......................... 403/260 |
| 6,209,175 B1 | | 4/2001 | Gershenson | |
| 6,543,751 B1 | | 4/2003 | Spruill | |
| 6,680,669 B1 | | 1/2004 | Terry | |

* cited by examiner

*Primary Examiner*—Daniel P. Stodola
*Assistant Examiner*—Nahid Amiri
(74) *Attorney, Agent, or Firm*—Barnes & Thornburg LLP

(57) ABSTRACT

An assembly is formed from a fastener and a plurality of elongate members. The fastener includes a wedge. A first elongate member is disposed through an opening in a second elongate member. The fastener engages the first elongate member, and the wedge engages the second elongate member to fasten the first and second elongate members to one another.

17 Claims, 8 Drawing Sheets

FASTENER

RELATED APPLICATION

The present application is related to and claims priority to U.S. Provisional Patent Application Ser. No. 60/519,409, filed on Nov. 12, 2003, entitled Hidden Fastener For Fence Pickets. The subject matter disclosed in that provisional application is hereby expressly incorporated into the present application.

FIELD OF THE INVENTION

The present invention relates generally to a fastener, and more particularly, to a fastener used to fasten various members together.

BACKGROUND AND SUMMARY OF THE INVENTION

A fastener used to fasten various members serves several purposes. The fastener will allow the fastening of the pair of members to be hidden behind the exteriors of the members to give the connection a more aesthetically pleasing appearance. The hidden fastener will also allow a quicker, less cumbersome connection, while at the same time form a stable connection. The connection will also allow for a member to be replaced without the need of replacing any other fastener or members. One illustrative application of the hidden fastener is fastening a fence picket and fence rail together.

Several methods for fastening fence pickets to fence rails currently exist. One method is welding the fence picket to the fence rail. Another is by connecting the fence rail and the fence picket to a common base structure.

One embodiment of the hidden fastener is made of plastic. This hidden fastener embodiment allows a generally vertical fence picket to be fastened to a generally horizontal fence rail. The configuration of this hidden fastener allows it to be received through an opening in a fence picket such that the hidden fastener and fence picket are connected. This embodiment also has a feature allowing the fence rail to be connected to the hidden fastener. With the hidden fastener already connected to the fence picket, the connection between the hidden fastener and the fence rail fastens the fence picket to the fence rail.

Another embodiment of the hidden fastener has a cylindrical peg having ridges. This cylindrical peg is shaped to fit into a circular opening existing in a fence picket. It is appreciated that various shapes of pegs may exist to fit into correspondingly-shaped openings in a fence picket, such as square or triangular, for example. This hidden fastener embodiment further comprises a wedge such that the wedge is attached to the cylindrical peg, allowing the fence picket to receive a desired portion of the cylindrical peg through the opening. The wedge also serves to secure the fence rail such that the generally horizontal fence rail and the generally vertical fence picket are fastened to each other. The fence rail may have an opening, allowing it to receive a fence picket. This configuration allows the fence picket to be received a desired portion before the wedge fastens the fence picket to the fence rail.

Additional embodiments, features and advantages will become apparent to those skilled in the art upon consideration of the following description of the illustrated embodiment exemplifying the best mode of carrying out the invention.

BRIEF DESCRIPTION OF DRAWINGS

Several embodiments of the present invention are shown in detail in connection with the following drawings, in which.

DETAILED DESCRIPTION OF THE DRAWINGS

Figure 1:
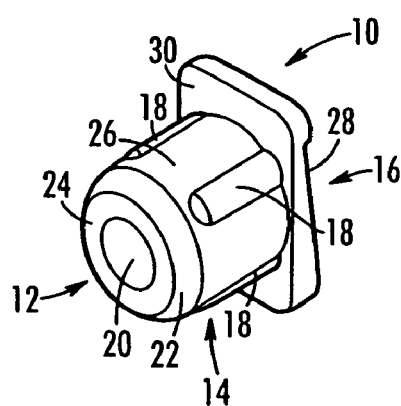
FIG. 1 is a perspective view of an illustrative embodiment of a hidden fastener.

A perspective view of an illustrative embodiment of a hidden fastener 10 is shown in FIG. 1. Hidden fastener 10 is formed of plastic in this embodiment. However, it is appreciated that hidden fastener 10 may be formed of various materials, such as metals, for example. Hidden fastener 10 has a peg 14 and a wedge 16. Peg 14 is illustratively cylindrical in shape, and is mounted on surface 30 of wedge 16 with peg 14 extending outwardly from surface 30. Peg 14 has ridges 18 located on surface 26 of peg 14. This embodiment illustratively shows peg 14 having four ridges 18. However, it is appreciated that peg 14 may have either more or less than four ridges. Peg 14 also has a front 12 which has an opening 20 and a surface 24. Peg 14 has surface 22 which connects surface 24 to surface 26, as illustratively shown in FIG. 1.

Figure 2:
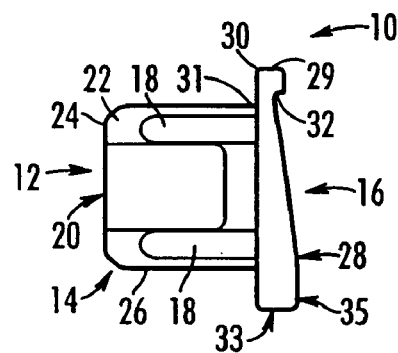
FIG. 2 is a side view of the illustrative embodiment of the hidden fastener shown in FIG. 1.

A side view of the illustrative embodiment of hidden fastener 10 is shown in FIG. 2. Wedge 16 is illustratively shown to include surface 28, end piece 29, and end 33. End piece 29 is configured with surface 28 to form edge 32. Wedge 16 has a thickness 31 at edge 32 and increases in thickness along surface 28 until reaching a thickness 35 at end 33, as illustratively shown in FIG. 3.

Figure 3:
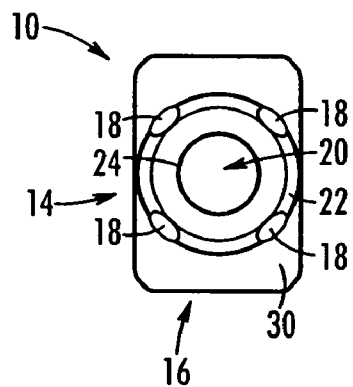
FIG. 3 is a front view of the illustrative embodiment of the hidden fastener shown in FIGS. 1–2.

A front view of the illustrative embodiment of hidden fastener 10 is shown in FIG. 3.

Figure 4:
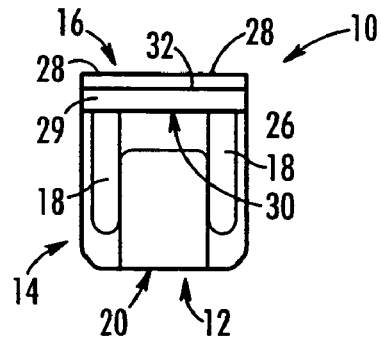
FIG. 4 is a top view of the illustrative embodiment of the hidden fastener shown in FIGS. 1–3.

A top view of the illustrative embodiment of hidden fastener 10 is shown in FIG. 4.

Figure 5:
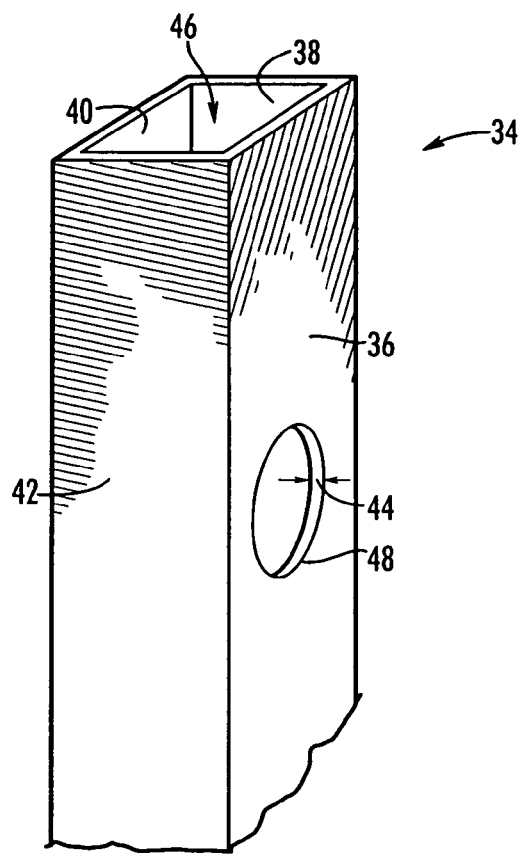
FIG. 5 is a perspective view of an illustrative embodiment of a fence picket.

A perspective view of an illustrative embodiment of a portion of a fence picket 34 is shown in FIG. 5. In this illustrative embodiment, fence picket 34 is formed of aluminum. However, it is appreciated that fence picket 34 may be formed of various materials, such as plastics or other metals, for example. Fence picket 34 has sides 36, 38, 40, and 42. Sides 36, 38, 40, and 42 are configured such that fence picket 34 is rectangular in shape. It is appreciated that alternative shapes exist for various embodiments of fence pickets, such as a cylindrical fence picket, for example. Fence picket 34 also has a thickness 44 with a hollow interior 46. Fence picket 34 has opening 48 illustratively located through side 36. Opening 48 is circular in shape in this particular embodiment of fence picket 34. However, it is appreciated that opening 48 may be of various shapes.

Figure 6:
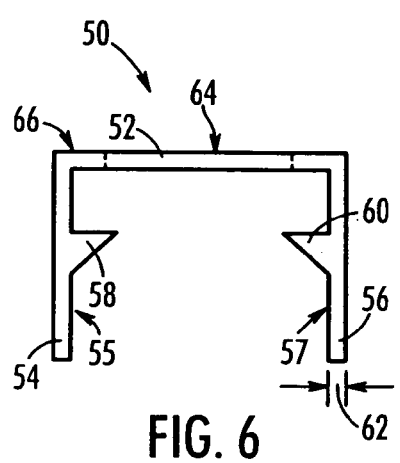
FIG. 6 is an end view of an illustrative embodiment of a fence rail.

An end view of an embodiment of a fence rail 50 that may be used with hidden fastener 10 is illustratively shown in FIG. 6. It is appreciated that fence rail 50 is only an illustration of one type of fence rail that may be used with an embodiment of the hidden fastener. In this illustrative embodiment, fence picket 34 is formed of aluminum. However, it is appreciated that fence picket 34 may be formed of various materials, such as plastics or other metals, for example. Other types of fence rails may be appropriate. Fence rail 50 has an end 52, a top 66, and sides 54, 56. Sides 54, 56 are connected to top 66, as illustratively shown in FIG. 6. Fence rail 50 has a thickness 62. Fence rail 50 has ridges 58, 60 which extend along the interiors 55, 57 of sides 54, 56, respectively, with ridges 58, 60 substantially parallel to top 66. Ridges 58, 60 are configured to fit onto edge 32 of hidden fastener 10. (See FIG. 2.) Fence rail 50 also illustratively comprises opening 64, which is configured to receive a fence picket, such as that of fence picket 34 illustratively shown in FIG. 5.

Figure 7:
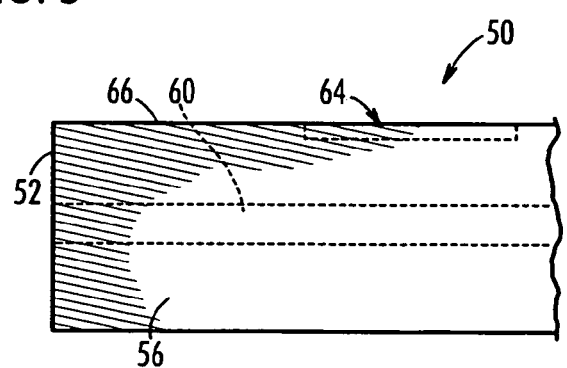
FIG. 7 is a side view of the illustrative embodiment of the fence rail shown in FIG. 6.

A side view of a portion of fence rail 50 is illustratively shown in FIG. 7. This view illustratively shows where opening 64 may be positioned relative to end 52. This view also illustrates how ridge 60 extends along side 56, with ridge 58 extending in a similar way along side 54.

Figure 8:
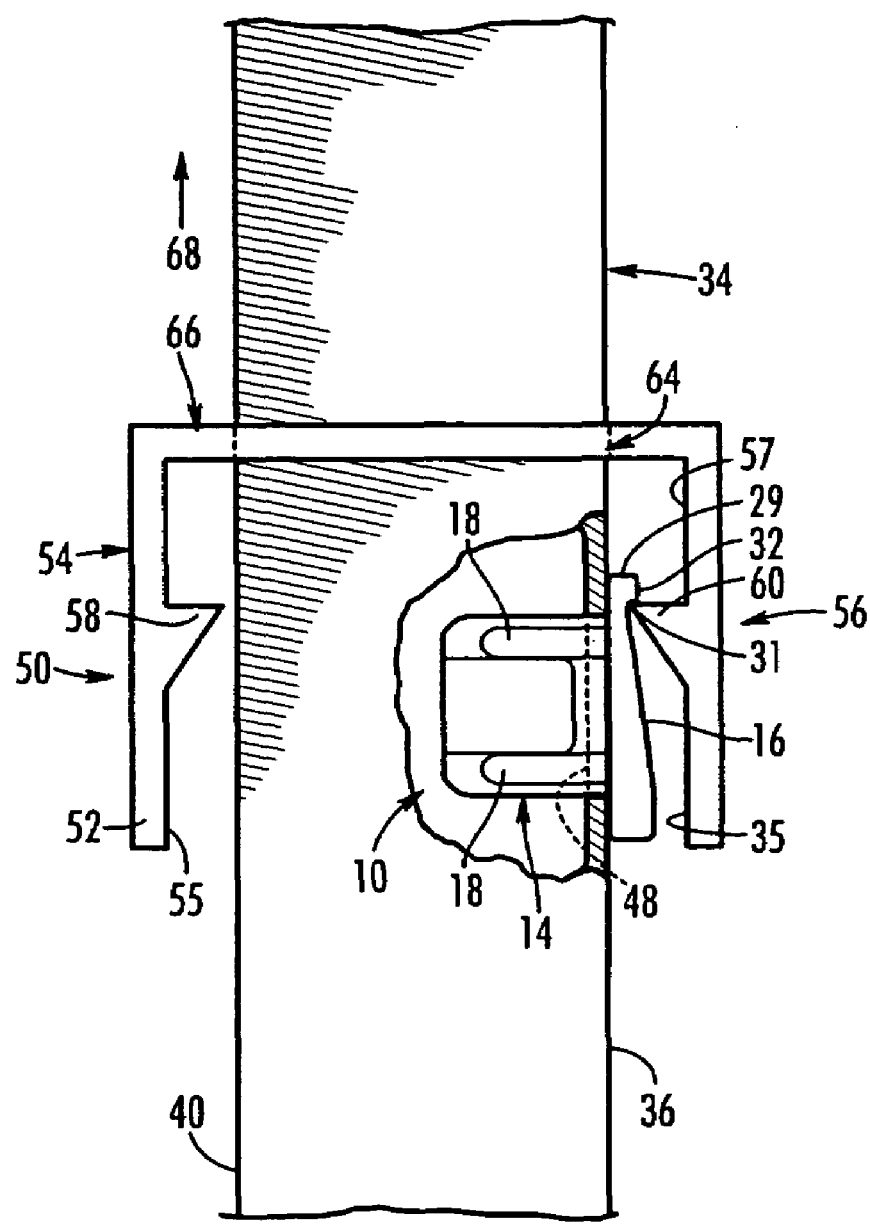
FIG. 8 is an end view with portions cutaway of the illustrative embodiments of a fence picket fastened to a fence rail through a hidden fastener.

An end view with portions broken away of hidden fastener 10 fastening fence rail 50 to a portion of fence picket 34 is illustratively shown in FIG. 8. A portion of fence picket 34 is broken away to illustratively show the fastening of fence picket 34 to fence rail 50 by hidden fastener 10. For purposes of this embodiment of hidden fastener 10, fence rail 50 is illustratively shown as being generally horizontal and fence picket 34 is illustratively shown as being generally vertical. Peg 14 of hidden fastener 10 is illustratively shown to be received by fence picket 34 through opening 48. Opening 48 should be of a dimension to receive peg 14 such that peg 14 is snug-fitting, and such that surface 30 of wedge 16 is adjacent side 36 of fence picket 34, as illustratively shown in FIG. 8. With peg 14 received by fence picket 34, fence picket 34 may be inserted through opening 64 of fence rail 50 in an upwardly direction 68, as illustratively shown in FIG. 8. While moving in upwardly direction 68, end piece 29 slides past ridge 60, allowing edge 32 to move onto ridge 60. The increasing thickness of wedge 16 from thickness 31 to thickness 35 restricts fence picket 34 from moving in upwardly direction 68 once surface 28 makes contact with ridge 60. Once edge 32 slips past ridge 60, edge 32 then hangs 5 over ridge 60, as illustratively shown in FIG. 8, such that fence picket 34 is restricted from moving in a direction opposed to upwardly direction 68. The positioning of ridge 60 between edge 32 and surface 28 fastens fence picket 34 to fence rail 50, as illustratively shown in FIG. 8.

It is appreciated that alternative configurations of that shown in FIG. 8 exist. For example, fence picket 34 may be positioned such that fence picket 34 and fence rail 50 are fastened together by ridge 58 being positioned between edge 32 and surface 28. Another alternative configuration has fence picket 34 having a second opening being located through side 40 to receive another hidden fastener 10. This would allow ridge 58 to be positioned between an edge 32 and a surface 28, similar to ridge 60 in FIG. 8, such that fence rail 34 would have two hidden fasteners 10 inserted into it. Another alternative configuration exists where fence picket 34 is not only inserted through fence rail 50, but also a second fence rail 50. In this alternative configuration, a second hidden fastener 10 would be received by side 40 of fence picket 34, with a ridge 60 of the second fence picket 34 positioned between a surface 28 and edge 32 of the second hidden fastener 10. Another alternative configuration exists where fence rail 34 is inserted through two fence rails 50, similar to the foregoing, but with a hidden fastener 10 received through sides 36, 40 for both fence rails 50, for a total of four hidden fasteners 10. Ridges 58, 60 of fence rails 50 would be positioned between edge 32 and a surface 28.

Figure 9:
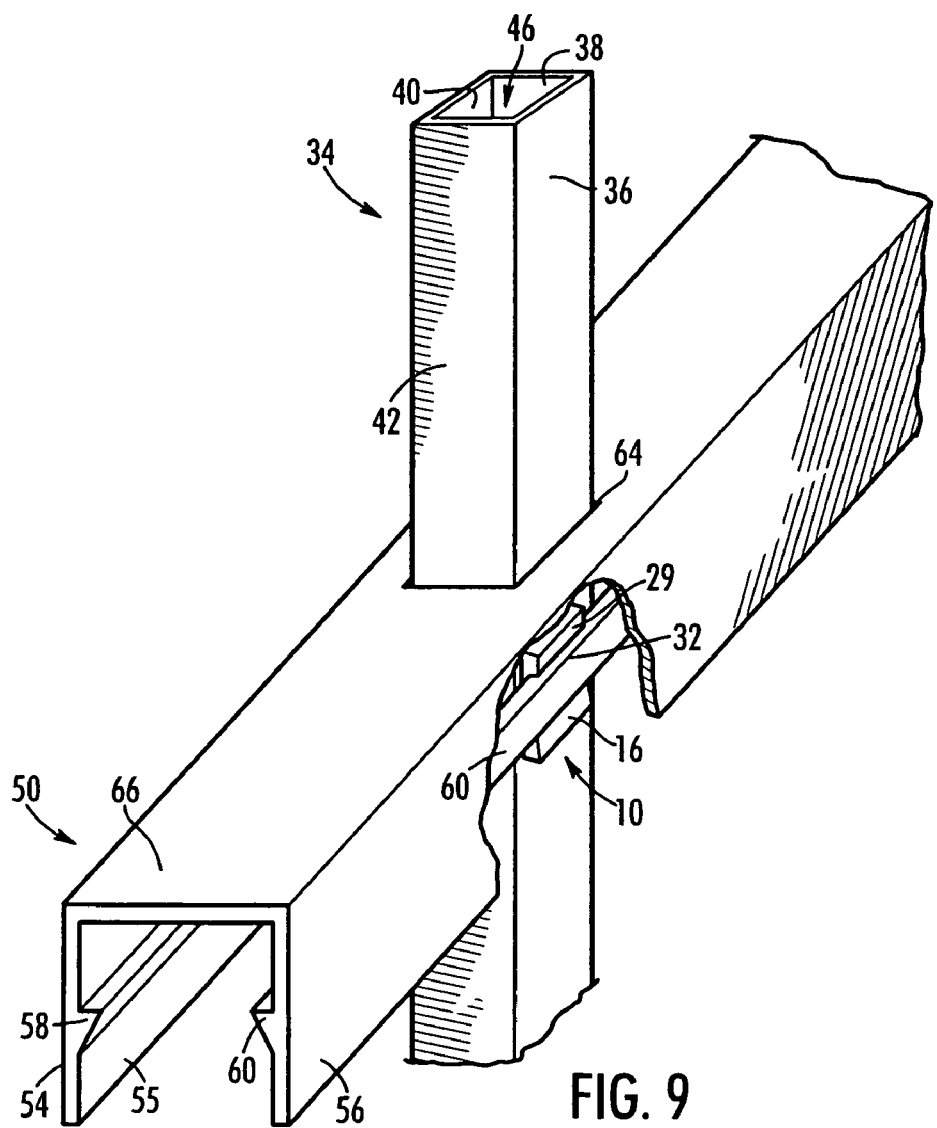
FIG. 9 is a perspective view of FIG. 8 with portions cutaway.

A perspective view with portions broken away of the embodiment of FIG. 8 is illustratively shown in FIG. 9. This view also illustratively shows only portions of fence picket 34 and fence rail 50. A portion of fence rail 50 is broken away to illustrate the manner in which edge 32 abuts ridge 60.

Figure 10:
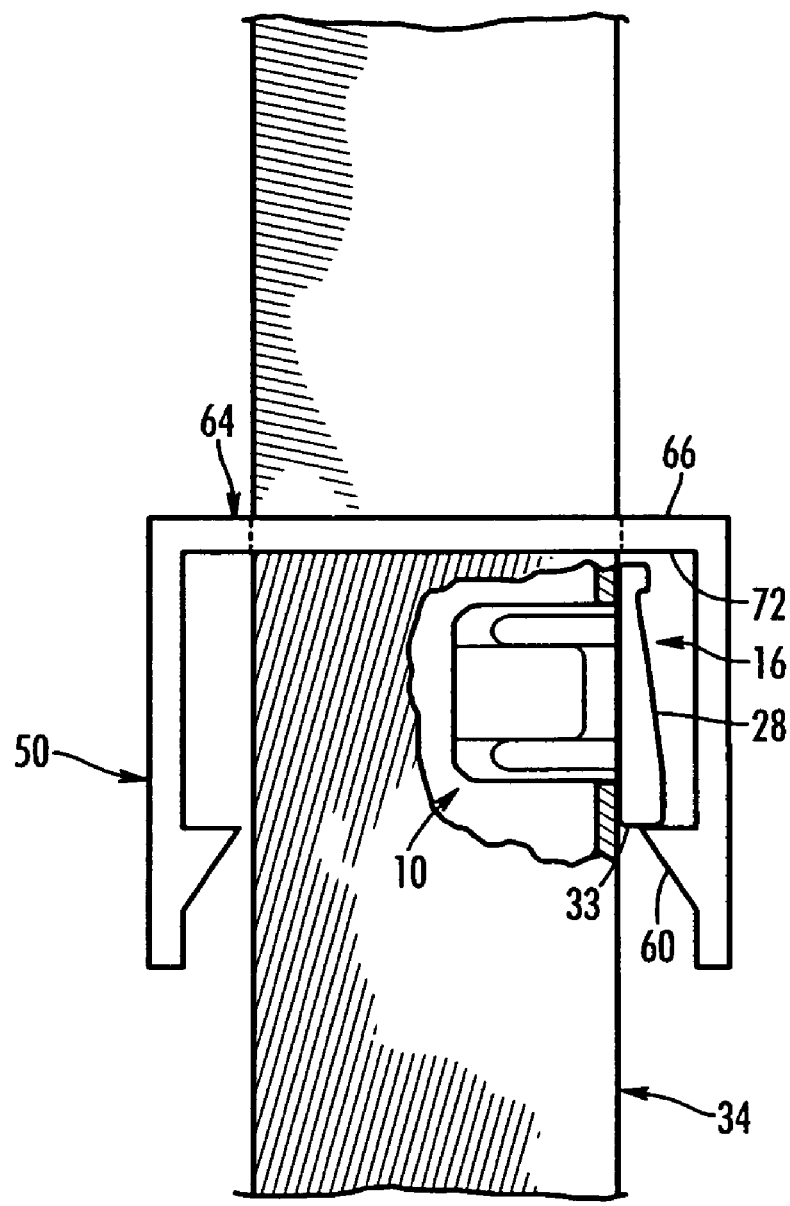
FIG. 10 is end view with portions cutaway of another illustrative embodiment of a fence picket fastened to a fence rail through a hidden fastener.

Another embodiment of hidden fastener 10 is shown in FIG. 10. The arrangement of FIG. 10 shows an alternative way of fastening fence rail 50 and fence picket 34 together with hidden fastener 10. Continuing to insert fence picket 34 through fence rail 50 from the position shown in FIG. 9 will cause surface 28 to move past ridge 60 until wedge 16 is position between ridge 60 and surface 72. Once wedge 16 is in this position, it is secured between surface 72 and ridge 60 securing hidden fastener 10 and fence picket 34 to fence rail 50. End piece 29 prevents wedge 16 from moving through opening 64 of fence rail 50.

Figure 11A:
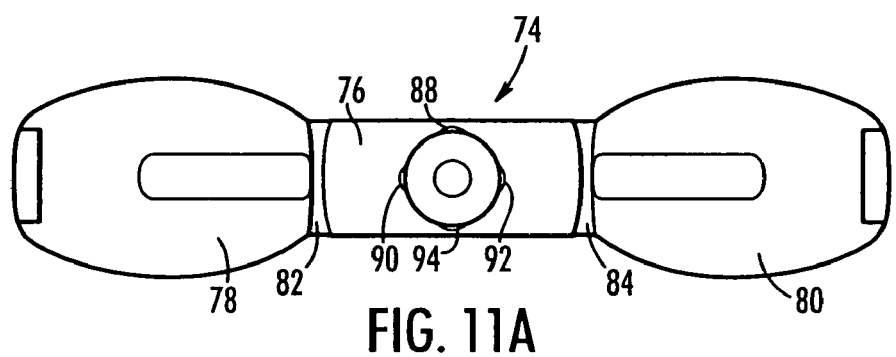
FIG. 11A is front view of another illustrative embodiment of a hidden fastener.
Figure 11B:
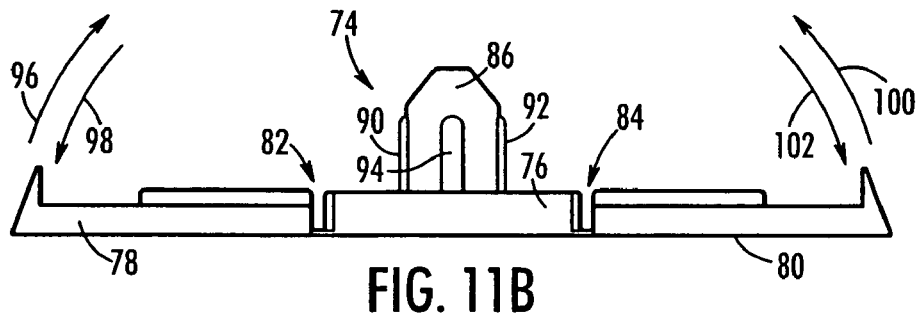
FIG. 11B is a side view of the illustrative embodiment of the hidden fastener shown in FIG. 11A.

A front view of another embodiment of a hidden fastener 74 is shown in FIG. 11A. Hidden fastener 74 includes base 76 and wedges 78, 80. Wedges 78, 80 are connected to base 76 through hinge points 82, 84, respectively. Peg 86 extends from base 76 as shown in FIG. 11B. Peg 86 includes ridges 88, 90, 92, 94.

A side view of hidden fastener 74 is shown in FIG. 11B. Wedge 78 is movable at hinge point 82 in directions 96, 98 and wedge 80 is movable at hinge point 84 in directions 100, 102.

Figure 12:
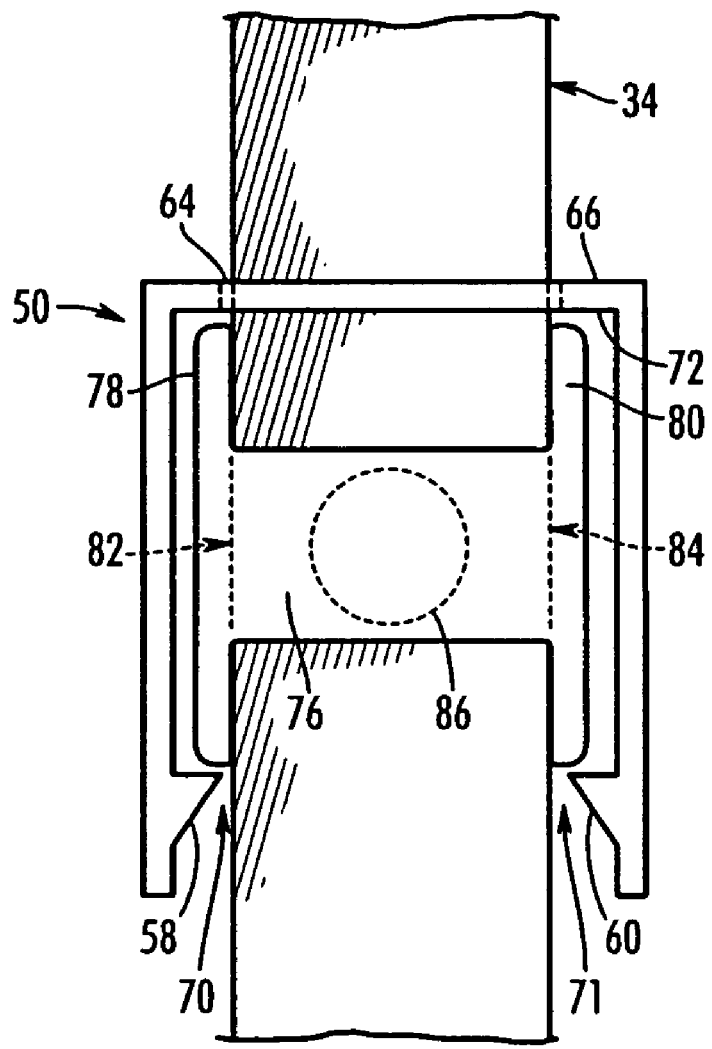
FIG. 12 is an end view an illustrative embodiment of a fence picket fastened to a fence rail through the hidden fastener shown in FIGS. 11A and 11B.

An end view, of an illustrative embodiment of hidden fastener 74 fastening fence rail 50 and fence picket 34 is shown in FIG. 12. Similar to hidden fastener 10, peg 86 of hidden fastener 74 can be inserted through an opening 48 of fence picket 34. Once peg 86 is inserted, fence picket 34 can be inserted through opening 64, as shown in FIG. 12. As fence picket 34 is inserted into opening 64, wedges 78, 80 move past ridges 58, 60, through spaces 70, 71, respectively. Wedges 78, 80 become positioned between surface 72 and ridges 58, 60 respectively. Once wedges 78, 80 are in this position, they cannot move through opening 64, nor return past ridges 58, 60, thereby fastening said fence rail 50 and fence picket 34 together. Wedges 78, 80 can be formed of a resilient material, such that they are biased away from said fence picket 34, each moving towards sides 54, 56, respectively, of fence rail 50.

Figure 13:
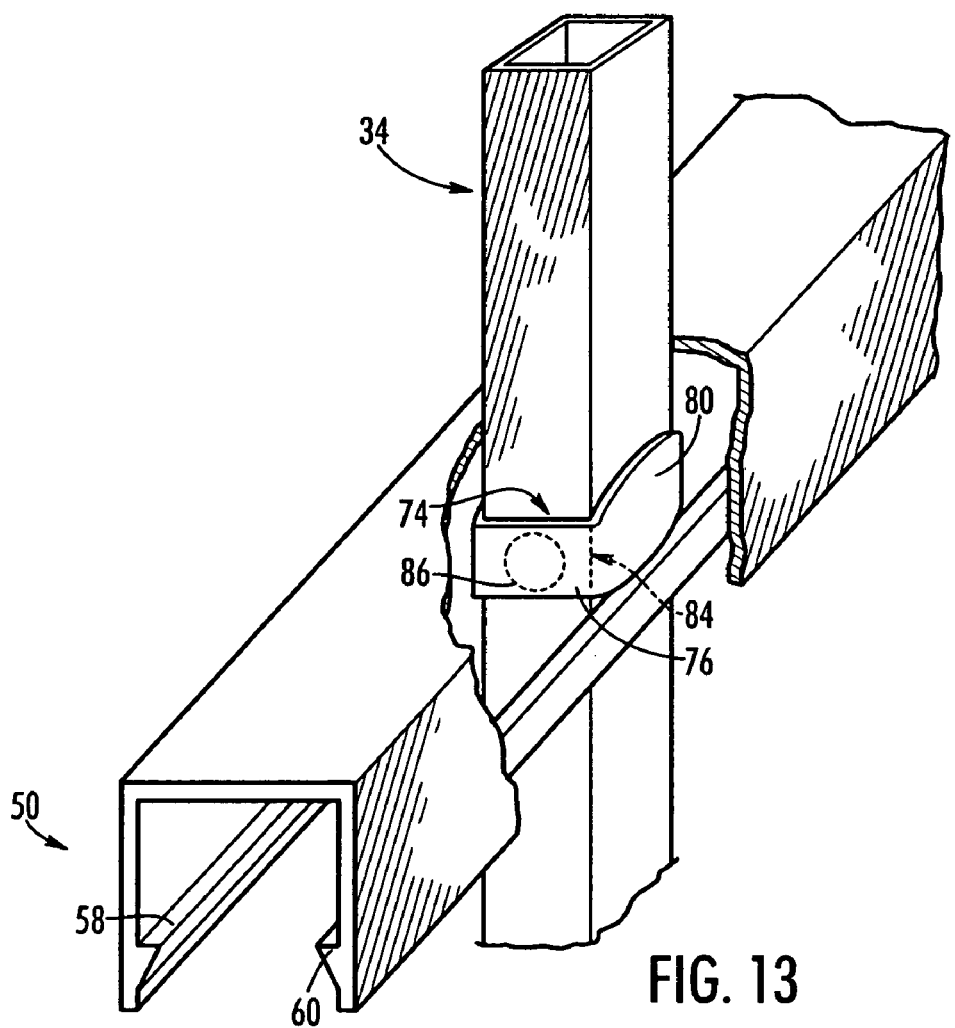
FIG. 13 is a perspective view of FIG. 12 with portions cutaway.

FIG. 13 shows a perspective view of FIG. 12 with portions cutaway. FIG. 13 shows the position of hidden fastener 74 with respect to fence rail 34 and fence post 50.

It is appreciated that the embodiments disclosed in the foregoing represent fence picket 34 as being generally vertical and fence rail 50 as being generally horizontal. However, it is contemplated that an individual skilled in the art could apply hidden fasteners 10, 74 to various combinations of members. Hidden fasteners 10, 74, or other embodiments thereof, may also be used with various members disposed in various relative orientations, in addition to the generally horizontal and generally vertical orientations discussed. Therefore, the embodiments disclosed herein are not intended to limit the manner in which hidden fasteners 10, 74 may be utilized.

Although the above description refers to particular means, materials and embodiments, one skilled in the art can easily ascertain the essential characteristics of the present invention. Various changes and modifications may be made to adapt to various uses and characteristics without departing from the spirit and scope of the present invention as set forth in the following claims.

What is claimed is:

1. An assembly comprising:
    a first elongate member having an opening formed therethrough;
    a second elongate member having an interior surface and an opening formed therethrough; and
    a fastener, said fastener comprising a wedge and a projection;
    wherein, the first elongate member is disposed through the opening in the second elongate member;
    wherein, the projection is dimensioned to be received by the opening in the first elongate member and the wedge engages the interior surface of said second elongate member to fasten the first and second elongate members to one another;
    wherein said interior surface of said second elongate member comprises a ridge; and
    wherein said ridge is located adjacent the opening in said second elongate member such that when said first elongate member is disposed through the opening a space is formed between the first elongate member and the interior surface.

2. The assembly of claim 1, wherein said wedge is located in the space between said first elongate member and said interior surface to fasten the first and second elongate members to one another.

3. The assembly of claim 2, wherein said wedge comprises a first relatively thin end and a second relatively thick end.

4. The assembly of claim 3, wherein said first elongate member is inserted into said opening of said second elongate member such that said ridge engages said thin end of said wedge, and is urged through said opening such that said thick end of the wedge passes over the ridge to fasten the first and second members to one another.

5. The assembly of claim 4, wherein said thin end of said wedge comprises a stop that prevents said wedge from being forced through the opening of said second elongate member.

6. The assembly of claim 3, wherein said wedge comprises a flexible portion.

7. The assembly of claim 6, wherein a space is formed between said ridge and said first elongate member when the first elongate member is disposed through said opening of said second elongate member.

8. The assembly of claim 7, wherein said first elongate member is insertable into said opening of said second elongate member such that said flexible portion engages said ridge, and wherein said ridge biases said flexible portion toward said first elongate member allowing said flexible portion to move past said ridge and into said space between said opening and said ridge.

9. The assembly of claim 8, wherein said flexible portion flexes away from said first elongate member and toward said interior surface to fasten said first and second elongate members to one another.

10. An assembly comprising:
    a first elongate member having an opening formed therethrough;
    a second elongate member having an interior surface and an opening formed therethrough; and
    a fastener, said fastener comprising a wedge and a projection;
    wherein, the first elongate member is disposed through the opening in the second elongate member;
    wherein, the projection is dimensioned to be received by the opening in the first elongate member and the wedge engages the interior surface of said second elongate member to fasten the first and second elongate members to one another;
    wherein said interior surface of said second elongate member comprises a ridge; and
    wherein said wedge engages said ridge fastening said first and second elongate members to one another.

11. The assembly of claim 10, wherein said wedge comprises a tapered surface having a thick end and a thin end, said wedge further comprising an edge extending outwardly from said thin end of said tapered surface.

12. The assembly of claim 11, wherein said first elongate member is insertable into the opening of said second elongate member such that said edge passes over said ridge.

13. The assembly of claim 12, wherein said ridge is positioned between said tapered surface and said edge.

14. An assembly comprising:
    a first elongate member having an opening formed therethrough;
    a second elongate member having an interior surface and an opening formed therethrough; and
    a fastener, said fastener comprising a wedge and a projection;
    wherein, the first elongate member is disposed through the opening in the second elongate member;
    wherein, the projection is dimensioned to be received by the opening in the first elongate member and the wedge engages the interior surface of said second elongate member to fasten the first and second elongate members to one another;
    wherein said interior surface of said second elongate member comprises a ridge;
    wherein said ridge is located adjacent the opening in said second elongate member such that when said first elongate member is disposed through the opening a space is formed between the first elongate member and the interior surface; and
    wherein said wedge engages said ridge fastening said first and second elongate members to one another.

15. The assembly of claim 14, wherein said wedge comprises a tapered surface having a thick end and a thin end, said wedge further comprising an edge extending outwardly from said thin end of said tapered surface.

16. The assembly of claim 15, wherein said first elongate member is insertable into the opening of said second elongate member such that said edge passes over said ridge.

17. The assembly of claim 16, wherein said ridge is positioned between said tapered surface and said edge.

* * * * *